United States Patent
Von Waitz et al.

(10) Patent No.: US 9,823,148 B2
(45) Date of Patent: Nov. 21, 2017

(54) FORCE-MEASURING DEVICE

(71) Applicant: Uniflex-Hydraulik GMBH, Karben (DE)

(72) Inventors: Harald Von Waitz, Kahl am Main (DE); Carsten Baumgartner, Laubach (DE); Vaclav Hejplik, Dietzenbach (DE)

(73) Assignee: UNIFLEX-HYDRAULIK GMBH, Karben (DE)

( * ) Notice: Subject to any disclaimer, the term of this patent is extended or adjusted under 35 U.S.C. 154(b) by 206 days.

(21) Appl. No.: 14/799,049

(22) Filed: Jul. 14, 2015

(65) Prior Publication Data

US 2015/0316433 A1 Nov. 5, 2015

Related U.S. Application Data

(63) Continuation of application No. PCT/EP2014/001179, filed on May 2, 2014.

(30) Foreign Application Priority Data

May 3, 2013 (DE) .......................... 10 2013 007 535

(51) Int. Cl.
*G01L 1/26* (2006.01)
*G01L 5/04* (2006.01)
(Continued)

(52) U.S. Cl.
CPC .................. *G01L 5/12* (2013.01); *G01L 1/04* (2013.01); *G01L 5/0085* (2013.01)

(58) Field of Classification Search
CPC ........... G01L 5/12; G01L 1/04; G01L 5/0085; B21D 39/048
(Continued)

(56) References Cited

U.S. PATENT DOCUMENTS 2,720,112 A * 10/1955 Coyne et al. ............. E04C 5/08
73/862.392
4,259,863 A    4/1981 Rieck et al.

FOREIGN PATENT DOCUMENTS

DE    1059687 B    6/1959
DE    147874 A1    4/1981
(Continued)

OTHER PUBLICATIONS

International Search Report, dated Jul. 11, 2014, for International Application No. PCT/EP2014/001179, pp. 1-3.
(Continued)

*Primary Examiner* — Lisa Caputo
*Assistant Examiner* — Roger Hernandez-Prewitt
(74) *Attorney, Agent, or Firm* — Myers Wolin, LLC

(57) ABSTRACT

A force-measuring device is provided for integrating measurement of at least three radial forces acting centrally, in particular for radial presses or collets. The force-measuring device comprises a stretching-element assembly, which is concentric to a measurement axis and which comprises at least one stretching element. The force-measuring device also has at least three pressure elements spaced from each other in a circumferential direction, wherein two spreading elements are connected to the at least one stretching element at ends of the stretching element, the pressure elements are supported, by means of pressure inclines, on corresponding sliding inclines of the spreading elements, a transmitting element is fastened to a first of the two spreading elements, and a measuring sensor acts between the second of the two spreading elements and the transmitting element.

17 Claims, 2 Drawing Sheets

(51) Int. Cl.
*G01L 5/12* (2006.01)
*G01L 1/04* (2006.01)
*G01L 5/00* (2006.01)

(58) Field of Classification Search
USPC ...... 73/862.392, 862.542, 862.636, 862.638;
72/392, 393; 277/468
See application file for complete search history.

(56) References Cited

FOREIGN PATENT DOCUMENTS

| | | |
|---|---|---|
| DE | 4025353 A1 | 2/1991 |
| DE | 68915875 T2 | 11/1994 |
| DE | 10051010 A1 | 4/2002 |
| DE | 102005050787 A1 | 4/2007 |
| EP | 0074524 A1 | 3/1983 |
| EP | 0419129 A1 | 3/1991 |
| KR | 20090120326 A | 11/2009 |

OTHER PUBLICATIONS

German decision to grant document with German search report, dated Mar. 5, 2014, for German patent application 10 2013 007 535.1 with a partial English translation, 18 pages total.

\* cited by examiner

FORCE-MEASURING DEVICE

CROSS REFERENCE TO RELATED APPLICATIONS

This application is a continuation under 35 U.S.C. §120 of International Application PCT/EP2014/001179, filed May 2, 2014, which claims priority to German Application 10 2013 007 535.1, filed May 3, 2013, the contents of each of which are incorporated by reference herein.

FIELD OF THE INVENTION

The invention relates to a force-measuring device for integrating measurement of at least three centrally acting radial forces, especially for radial presses or collet chucks, comprising an expander element arrangement concentric with an axis of measurement and comprising at least one expander element.

BACKGROUND

In many technical applications, especially in connection with radial presses and collet chucks, three or more radial forces may be acting centrally, i.e. toward a central axis of measurement. In the case of a radial press, for example, the number of radial forces occurring may be determined by the number of press jaws present. A need exists to sense the said radial forces in their entirety in the sense of a spatially integrating measurement and to derive therefrom an effective force that represents the superposition of the acting radial forces.

DE 68915875 T2 discloses a device with which a force of a fluid medium acting radially on several ribs of a ribbed cage is converted into an amplified axially acting force of a thrust rod coupled with the ribs. To convert the radial force into the axial force, the ribs can be biased by means of a spring, the spring tension of which relaxes in the course of time. The same is true for the ribs, when these are made of elastic material. By means of the axial force of the thrust rod, a switch can be actuated. But DE 68915875 T2 does not yet provide any indication of how to use the device for measuring forces. It would not even be very suitable for doing so, because the compliance of the many elastic elements would act detrimentally on the measurement accuracy. Furthermore, the ribs according to the invention are very weak and cannot withstand any large forces. Especially if the ribs were to be fastened so to swivel on one another, as is also an alternative objective, the device would not be capable of withstanding and measuring high forces, as occur, for example, in radial presses or during the use of collet chucks.

DE 4025353 A1 discloses two substantially cylindrical sensors for measuring forces acting perpendicularly relative to their respective shell surfaces. As an example, it is provided that the sensor will be driven into a bore, in order to measure continuous radial force variations therein. According to one embodiment, the sensor is equipped for this purpose with a tubular piezoelectric double crystal, which responds to radial forces. Such a solution is very expensive. According to a further embodiment, a sensor body filled with oil is provided. When radial forces act on the sensor body, they cause, in the oil present therein, a pressure change, which is transmitted by a piezoresistive sensor. An electromechanical transducer arrangement is necessary to measure the force due to the described two sensors, since direct measurement with purely mechanical means is not possible. Furthermore, the sensors are suitable more for long-time dynamic force changes and less for rapidly changing radial forces, such as occur in a radial press or a collet chuck.

U.S. Pat. No. 4,259,863 A discloses an extremely complex device for measuring forces and bending moments in and around the x, y and z axes by means of a plurality of sensors and springs. However, this device has only very limited suitability for sensing radial forces.

DE 1059687 B teaches an instrument for measuring the mean tension of several wires clamped parallel to one another. Therein that force which is necessary to spread the wires is determined as a measure of the mean tension in the wires clamped parallel to one another. For this purpose, the instrument is equipped with an elongated expander member, which extends along the axis and is elastically deformable in axial direction, several knee levers, which are disposed around the expander member, can be subjected to force by the wires and act on the expander member, and means for measuring the change in length of the expander member. This change in length of the expander element is determined by the vibrational behavior of a string, which is formed by a wire clamped in the expander element along the axis and which is fixed to the ends of both spreader members. The frequency of the string—which varies with the length expansion—is sensed by means of electromagnets, which are attached to the expander element itself and also provide vibrational excitation of the string.

DE 1020050505787 A1 discloses a joining element, which is suitable for measuring a vertical force. It has a component that can be subjected to a vertical force and is disposed between two spring-biased, conical plates guided displaceably on a horizontal axis. The degree of displacement of the two plates relative to one another on the axis represents a measure of the axial force acting on the component.

KR 1020090120326 A relates to the determination of tensions in a pipe during the axial expansion thereof and/or of properties of the material of an axially expanded pipe.

In this respect, further technological background of the invention is also represented—albeit without disclosure of any expander element arrangement of the type mentioned in the introduction—by DE 10051010 A1 and EP 0419129 A1. DE 10051010 A1 discloses a force-measuring tool in which two levers are adapted to the press geometry of a four-mandrel press head and act on a pressure sensor during compression. EP 0419129 A1 discloses a press with force-measuring devices, such as strain gauges, disposed in the press.

None of the cited devices make it satisfactorily possible to achieve an accurate and reliable integrating measurement in the foregoing sense with simple means, especially in radial presses or collet chucks.

In view of the problems, restrictions and disadvantages of the devices known from the prior art as described in the foregoing, it is the object of the invention to provide a simple force-measuring device, with which an improved, integrating measurement of radial forces is possible, especially in radial presses or collet chucks.

SUMMARY

The object is achieved with the force-measuring device according to the claims. The force-measuring device is characterized, in functional combination with the features mentioned in the introduction, by the fact that the force-measuring device comprises at least three thrust members spaced apart from one another in circumferential direction, wherein two spreader members are joined to the ends of the at least one expander element, the thrust members are braced via thrust chamfers against corresponding sliding chamfers of the spreader members, a transmission member is fixed on a first of the two spreader members and a measuring sensor acts between the second of the two spreader members and the transmission member.

By means of the inventive force-measuring device, it is possible to convert at least three radial forces acting thereon internally into an axial force, which is perpendicular to the sum of the radial forces and corresponds to the effective force, and to measure this. The value of this axial force is determined from the expansions of the spreader members and possibly also of the at least one expander element in an axial direction.

The description hereinafter relates—unless otherwise mentioned—to a typical radial press with at least three press jaws, which can be displaced radially inward perpendicular to a common central axis by means of suitable force-applying means, whereby a workpiece present between the press jaws can be pressed radially. The invention represents an area of application that is certainly preferable for such a radial press, but it is not limited thereto. As another example, it is possible to use the inventive force-measuring device to measure an effective force generated by a collet chuck.

The force-measuring device is equipped with at least three thrust members, on which the centrally acting radial forces of the press jaws can act. To measure the effective force of the press jaws, the force-measuring device instead of a workpiece may be positioned between the press jaws. By virtue of this preferred application, on which the further description is based, it is possible in particularly simple manner to measure the effective force very accurately. Furthermore, however, it is also possible to position both a workpiece and the force-measuring device simultaneously between the press jaws, although this may lead to disadvantages in terms of handling ability and measurement accuracy. Particularly preferably, the number of radial forces to be measured is the same as the number of thrust members. For example, if a radial press has four press jaws capable of exerting four radial forces, it is preferably provided that the force-measuring device has four thrust members, which are disposed in such a way that they correspond with the press jaws. The press jaws can be displaced radially in the direction of the force-measuring device positioned between them. When the number of press jaws is the same as the number of thrust members and the press jaws have been displaced toward the force-measuring device sufficiently far that the press jaws bear on the thrust members, if furthermore a force is directed into the press jaws, these forces can be transmitted to the thrust members, which are thereby displaced radially in a direction perpendicular to the axis of measurement.

The force-measuring device may be substantially cylindrical and on its circumference may have recesses for receiving the thrust members. Each thrust member may be inserted preferably into respectively one recess and be secured by suitable means against inadvertently slipping out of the recesses. Because of the radial forces transmitted to them, each thrust member can be displaced in the inventive sense by a displacement path radially toward the axis of measurement. For example, to protect the rest of the force-measuring device from the effects of radial forces of the press jaws, it may be provided that the thrust members in the unloaded condition are allowed to project radially by as much as the length of the displacement path or more beyond the circumference of the force-measuring device. To ensure that the thrust members do not block one another during their radial displacement toward the axis of measurement, the thrust members do not adjoin one another directly, but instead are spaced apart from one another.

The at least one expander element is disposed between the thrust members and is joined at its ends to two spreader members. The expander element and the spreader members are made of an elastic material, and the spreader members in particular are designed such that they can be expanded and contracted again in axial direction, i.e. perpendicular to the direction of the radial forces as well as in a direction parallel to the axis of measurement. The inventive expansion is caused by the radial displacement of the thrust members perpendicular to the axis of measurement.

In order to be able to convert the radial forces of the thrust members acting perpendicular to the axis of measurement into an axial force acting along the direction of the axis of measurement and thus leading to expansion of the spreader members in a direction parallel to the axis of measurement, the thrust members are provided with thrust chamfers and the spreader members with corresponding sliding chamfers. In the unloaded condition, i.e. when no radial forces are acting on the thrust members, the thrust members, the expander element and the spreader members are in their starting positions, in which the thrust members are braced via the thrust chamfers on the sliding chamfers of the spreader members. Thus the spreader members are loaded only by the dead weight of the thrust members, which does not lead to any expansion of the spreader members in the inventive sense and if necessary can be canceled out of the measurement, for example as an offset by appropriate means specific for the purpose. The spreader members and the expander element are designed to cooperate in such a way that the thrust members in the unloaded condition are held at a radial distance specific for them from the axis of measurement, as can be achieved, for example, by the choice of moduli of elasticity, geometries and joints of expander element and spreader members suitable for the purpose. When the thrust members are displaced perpendicular to the axis of measurement because of radial forces transmitted to them, an axial force proportional to the sum of the radial forces can be transmitted via the thrust chamfers and the sliding chamfers to the spreader members, thus expanding them in a direction parallel to the axis of measurement, while expansion of the expander element is also possible at the same time. If the radial force acting on the thrust members is decreased, the expansion of the spreader elements and if necessary of the expander element also may decrease correspondingly once again, until the spreader members, the expander element and the thrust members are returned to their respective initial positions, in which the thrust members are in the unloaded condition.

A transmission member is fixed to one of the spreader members. This has the purpose of supplying the axial force to a measuring sensor for measurement thereof. The measuring sensor acts between the second of the spreader members and the transmission member. As an example, the second of the spreader members may form a counter-bearing for the measuring sensor in axial direction and the measuring sensor may be firmly joined to or in contact with the transmission member so as to follow its movement in axial direction by the use of appropriate means, such as a spring. By virtue of the fixation of the transmission member to the first spreader member, the expansions of both spreader members and also of the expander member if one is present can then be transmitted to the transmission member and thus sensed by the measuring sensor.

According to a first embodiment, the expander element arrangement is formed by an expander sleeve, around which the thrust members are spaced apart from one another in circumferential direction and radially apart from the expander sleeve. The expander element arrangement consists of an expander element, which is formed by an expander sleeve. The expander sleeve is a central element, from the shell surface of which the thrust members are spaced apart as well as being spaced apart from one another in circumferential direction. This embodiment makes it possible to convert radial forces particularly uniformly to an axial force, thus permitting particularly accurate force measurement. Furthermore, a particularly firm joint between the expander sleeve and the spreader members joined thereto is possible. In addition, the transmission member can be disposed particularly well inside the expander sleeve and guided thereby. A radial gap is provided between the thrust members and the expander element, making it possible in a particularly simple way to expand the spreader elements in axial direction by the radial movement of the thrust members, albeit without squeezing the expander sleeve in radial direction. The material thickness of the expander sleeve is substantially limited only by the recesses for receiving the thrust members and the transmission member. Thereby it is possible to choose a particularly large material thickness, thus favoring the stability of the expander sleeve and making it possible to measure particularly high effective forces.

According to a second embodiment, it is provided that the expander element arrangement is formed by several expander rods disposed parallel to the axis of measurement and respectively between two neighboring thrust members. The expander element arrangement consists of several expander elements, which are respectively formed by an expander rod. The several expander rods are disposed concentrically around the axis of measurement. Each expander rod is joined at its ends to respectively two spreader members. The expander rods form an embodiment of the expander arrangement that is particularly economical in terms of material, whereby the weight and thus the costs of the force-measuring device can be reduced. It is further advantageous that the transmission member can be guided particularly easily.

Particularly advantageously it is provided that the expander element consists of a material with lower modulus of elasticity than that of the thrust members. This contributes to the fact that radial forces acting on the thrust members may lead to particularly strongly pronounced expansion of the expander element. Thus a displacement of the thrust members perpendicular to the axis of measurement can bring about a particularly large total expansion of the at least one expander element and the spreader members joined thereto, whereby the sensitivity of the force-measuring device can be increased.

Furthermore, it is particularly advantageous when the spreader members form a one-piece unit together with the expander element. In this way it is possible to achieve particularly high strength of the joint between expander element and spreader members, thus also having positive effects for the useful life of the expander sleeve and of the spreader members. Furthermore, it is advantageous that the expense for the joint between the spreader members and the expander element can be eliminated.

In a further advantageous embodiment, it is provided that the spreader members have a greater radial extent than the expander element. Thereby the sliding chamfers of the spreader members can offer a particularly long guide for the thrust chamfers of the thrust members.

If the two spreader members are constructed in the form of end plates, a contribution can be made to providing two interconnected spreader members, which bear at the ends of the thrust members and which inherently have particularly high strength.

It is also particularly advantageous when the transmission member is constructed as an axially disposed transmission rod. This can be guided particularly exactly. The transmission rod is designed to absorb axial tensile and compressive forces. Thereby it is possible in particularly simple manner, by means of the transmission rod, to sense both an increase and a decrease of the axial force and thus also of the radial forces acting on the thrust members.

In a further advantageous embodiment, it is provided that the sliding chamfers on the two spreader members are constructed as mirror images of one another. Hereby the radial forces acting on the individual thrust members can be transmitted particularly uniformly to the associated spreader members. This contributes to increasing the measuring accuracy and loading the spreader members uniformly. The latter contribution may have a particularly positive effect on the useful life of the spreader members.

It is particularly advantageous when the sliding chamfers converge toward the axis of measurement. By virtue of this geometry, radial forces that act toward the axis of measurement can bring about expansion of the spreader members in axial direction particularly effectively.

According to a further embodiment, the thrust members are secured in position at the ends of the spreader elements via securing elements that provide radial play. The securing elements are able to protect the thrust members from moving inadvertently and undesirably far out of the recesses of the force-measuring device particularly reliably without jamming, and also do so redundantly because the thrust members are secured at both ends. Because of the radial play, bending movements of the securing elements can be decreased particularly simply when the thrust members are moved radially toward the axis of measurement.

Furthermore, it is particularly advantageous when the force-measuring device has at least one handle at the end. This facilitates in particular mobile use of the force-measuring device. As regards use in radial presses, such a handle allows an operator to position the force-measuring device particularly securely between the press jaws. Thereby the force-measuring device can have particularly short structure at the end at which no handle is disposed. Particularly advantageously, a handle can also be provided respectively at both ends, thus making it possible to operate the force-measuring device particularly easily at both ends.

In a further embodiment, the measuring sensor is equipped with a dial gauge. The values sensed by the measuring sensor can be output particularly simply by appropriate indicating units without the need for electronic conversion. If the measuring sensor is alternatively equipped with an electrical signal converter, the values sensed by the measuring sensor can be supplied in particularly diverse manner to, for example, indicating, evaluating or controlling units.

Furthermore, it is advantageous when the force-measuring device has eight thrust members. This number of thrust members is particularly well suited for sensing radial forces applied in common radial presses having eight press jaws.

Finally, it is advantageously provided that the thrust chamfers and the sliding chamfers are formed by corresponding faces. The corresponding faces can be formed particularly simply by plane faces or round or conically turned faces. In a force-measuring device having eight thrust members, faces that as a whole are configured as an octagon are particularly advantageous. They contribute to making the thrust members slide at all times with an equally large part of their thrust faces on equally large parts of the sliding chamfers of the spreader members.

BRIEF DESCRIPTION OF THE DRAWINGS

The invention will be explained in more detail hereinafter on the basis of the drawing, wherein.

DETAILED DESCRIPTION OF THE PREFERRED EMBODIMENTS

Figure 1:
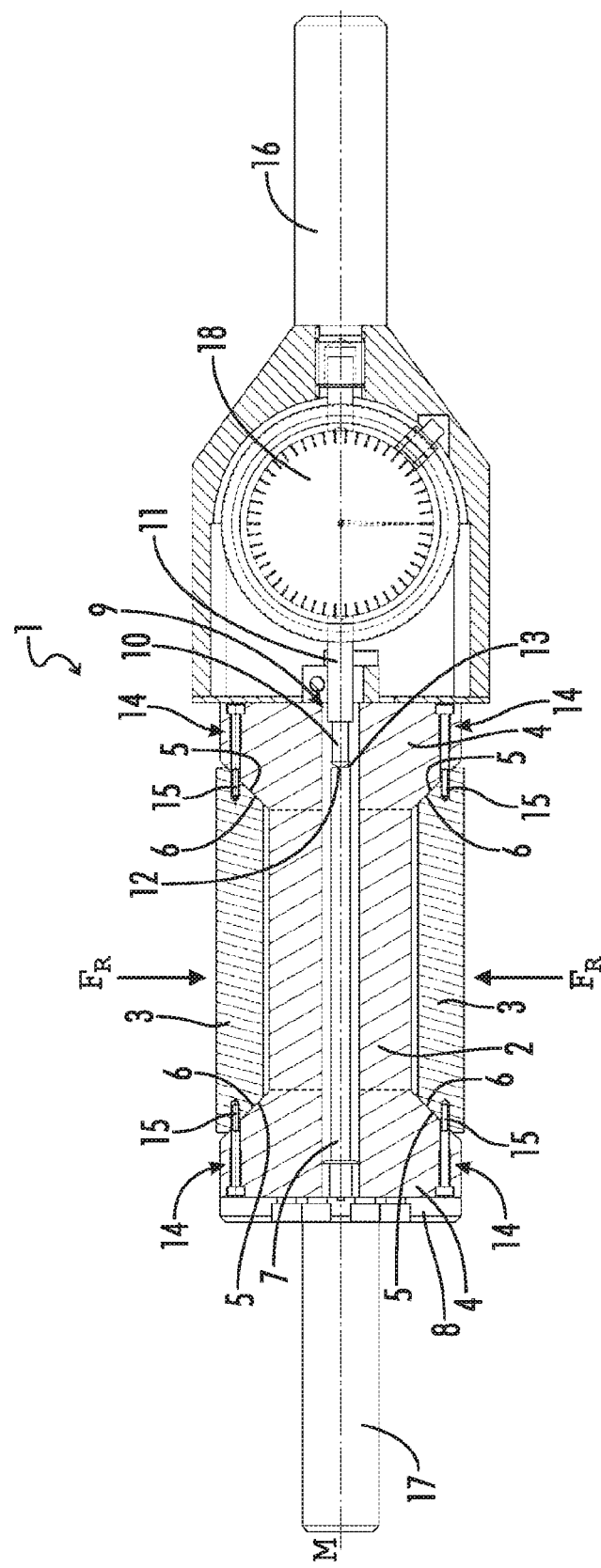
FIG. 1 shows a partial longitudinal section through an embodiment of the inventive force-measuring device in unloaded condition.

FIG. 1 shows an inventive force-measuring device 1 for measuring radial forces $F_R$ acting centrally perpendicular to an axis of measurement M. An expander element arrangement comprises a single expander element, which is formed by a central expander sleeve 2. Force-measuring instrument 1 further comprises eight thrust members 3 spaced apart from one another in circumferential direction. In FIG. 1, force-measuring device 1 is in unloaded condition, i.e. no external radial forces $F_R$ are acting on thrust members 3 ($F_R$=0).

At each end, expander sleeve 2 is joined to respectively one spreader member 4, wherein expander sleeve 2 together with spreader members 4 forms a one-piece unit and spreader members 4 are constructed in the form of end plates. The unit comprising expander sleeve 2 and spreader members 4 consists of a material with a smaller modulus of elasticity than thrust members 3. Thrust members 3 are braced via thrust chamfers 5 on corresponding sliding chamfers 6 of spreader members 4. These sliding chamfers 6 are constructed as mirror images of one another.

The transitions between expander sleeve 2 and spreader members 4 are indicated in FIG. 1 by broken lines perpendicular to axis of measurement M. The transitions are defined by the inner ends of sliding chamfers 6 as the innermost points of contact for thrust chamfers 5 of thrust members 3. Thrust chamfers 5 and sliding chamfers 6 are plane, corresponding faces, which converge toward axis of measurement M. Because of sliding chamfers 6, spreader members 4 have a greater radial extent than expander element 2.

On spreader member 4 illustrated at the left in FIG. 1, a transition member in the form of a transmission rod 7 is fastened indirectly via a retaining arrangement 8. A measuring sensor 9, which is designed to measure the axial force acting on transmission rod 7 acts between spreader member 4 illustrated at the right in FIG. 1 and transmission member 7. A bolt 10 can be retracted into and extended from a sleeve 11 of measuring sensor 9. Bolt 10 is biased by a spring, not illustrated, into the extended position, where its end face 12 is in contact with a corresponding end face 13 of transmission rod 7. If transmission rod 7 is displaced in the direction away from bolt 10, bolt 10 is correspondingly displaced by the spring, whereby the change of position of transmission rod 7 and thus also the axial force acting thereon is sensed and can be displayed by a dial gauge 18. An analogous result is obtained for movement of transmission rod 7 in the opposite direction.

A radial force $F_R$ can be transmitted to each of the thrust members 3. When radial forces $F_R$ are transmitted to thrust members 3, the latter are displaced radially and perpendicular to axis of measurement M. In the process, thrust chamfers 5 of thrust members 3 slide on sliding chamfers 6 of spreader members 4. Thereby spreader members 4 and also expander sleeve 2 are expanded in axial direction perpendicular to the direction of radial forces $F_R$ and in a direction parallel to axis of measurement M by a travel distance that is proportional to the superposition of the radial forces $F_R$ acting on thrust members 3. Transmission rod 7 together with retaining arrangement 8 is moved in axial direction toward the left. Bolt 10 is extended from sleeve 11 by the same travel distance as transmission rod 7 and retaining arrangement 8.

Each thrust member 3 is secured in position at its ends by securing elements 14. For this purpose thrust members 3 have bores in axial direction at both ends. Spreader members 4 have corresponding bores in axial direction. Securing pins 15, which have a smaller outside diameter than the bore diameters of thrust members 3 and spreader members 4, are inserted into the corresponding bores of thrust members 3 and spreader members 4, whereby thrust members 3 are secured in position with radial play. The force-measuring device is further provided at both ends with respective handles 16, 17.

Figure 2A:
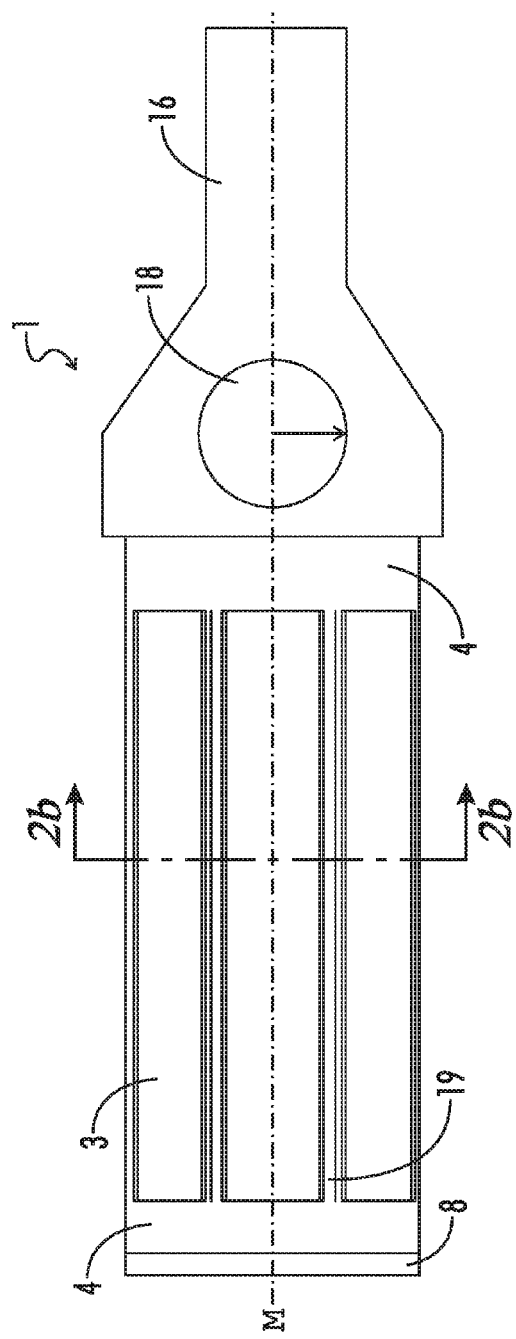
FIG. 2a shows a side view of a further embodiment of the inventive force-measuring device with several expander rods and FIG. 2b shows a cross section through the force-measuring device from FIG. 2a according to section plane 2b-2b.
Figure 2B:
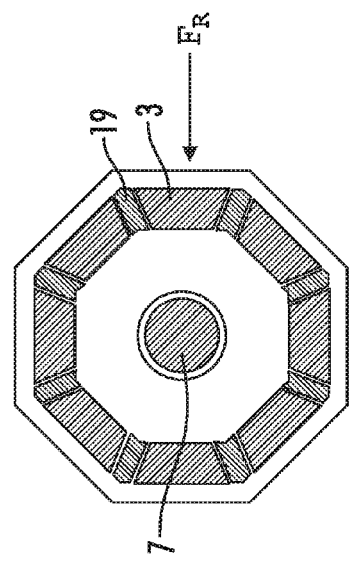

FIG. 2a and FIG. 2b show a further embodiment of inventive force-measuring device 1, which does not have any expander sleeve but instead has in total eight expander rods 19, which are disposed respectively between two thrust members 3, of which there are likewise in total eight, and which are spaced apart therefrom in circumferential direction. For better clarity, respectively only one expander rod 19 and one thrust member 3 are marked with reference symbols in FIGS. 2a and 2b. Expander rods 19 extend parallel to axis of measurement M and at each end are respectively joined in one piece to spreader members 4. Expander rods 19 and the thrust members as a whole form substantially an octagon in cross section. In a manner similar to FIG. 1, radial forces $F_R$ on thrust members 3 can be transmitted by thrust chamfers and sliding chamfers, not illustrated in FIGS. 2a and 2b, to spreader members 4 and thus converted to an axial force, which is perpendicular to the radial forces and which can be measured within force-measuring device 1 by analogy with the embodiment illustrated in FIG. 1 and displayed via dial gauge 18. Furthermore, FIG. 2a shows a handle 16 and a retaining arrangement 8, while FIG. 2b illustrates a transmission rod 7, all of which have the same features as the corresponding handle 16 and transmission rod 7 according to the embodiment illustrated in FIG. 1.

What is claimed is:

1. A force-measuring device (1) for integrating measurement of at least three centrally acting radial forces ($F_R$), especially for radial presses or collet chucks, comprising an expander element arrangement concentric with an axis of measurement (M) and comprising at least one expander element and at least three thrust members (3) spaced apart from one another in circumferential direction, wherein two spreader members (4) are joined to the ends of the at least one expander element (2, 19), wherein:

the thrust members (3) are braced via thrust chamfers (5) against corresponding sliding chamfers (6) of the spreader members (4), a transmission member (7) is fixed on a first of the two spreader members (4), and a measuring sensor (9) acts between the second of the two spreader members (4) and the transmission member (7).

2. The force-measuring device (1) of claim 1, wherein the expander element arrangement is formed by an expander sleeve (2), around which the thrust members (3) are disposed in a manner spaced apart from one another in circumferential direction and radially apart from the expander sleeve (2).

3. The force-measuring device (1) of claim 1, wherein the expander element arrangement is formed by several expander rods (19) disposed parallel to the axis of measurement and respectively between two neighboring thrust members (3).

4. The force-measuring device (1) of claim 1, wherein the expander element (2, 19) consists of a material with lower modulus of elasticity than that of the thrust members (3).

5. The force-measuring device (1) of claim 1, wherein the spreader members (4) form a one-piece unit together with the expander element (2, 19).

6. The force-measuring device (1) of claim 1, wherein the spreader members (4) have a greater radial extent than the expander element (2).

7. The force-measuring device (1) of claim 1, wherein the two spreader elements (4) are constructed in the form of end plates.

8. The force-measuring device (1) of claim 1, wherein the transmission member (7) is constructed as an axially disposed transmission rod (7).

9. The force-measuring device (1) of claim 1, wherein the sliding chamfers (6) on the two spreader members (4) are constructed as mirror images of one another.

10. The force-measuring device (1) of claim 1, wherein the sliding chamfers (6) converge toward the axis of measurement (M).

11. The force-measuring device (1) of claim 1, wherein the thrust members (3) are secured in position at the ends of the spreader elements (4) via securing elements (14) that provide radial play.

12. The force-measuring device (1) of claim 1, wherein the force-measuring device (1) has at least one handle (16, 17) at the end.

13. The force-measuring device (1) of claim 12, wherein a handle (16, 17) is provided respectively at both ends.

14. The force-measuring device (1) of claim 1, wherein the measuring sensor (9) is equipped with a dial gauge (18).

15. The force-measuring device (1) of claim 1, wherein the measuring sensor (9) is equipped with an electrical signal converter.

16. The force-measuring device (1) of claim 1, wherein the force-measuring device (1) has eight thrust members (3).

17. The force-measuring device (1) of claim 1, wherein the thrust chamfers (5) and the sliding chamfers (6) are formed by corresponding faces.

* * * * *